United States Patent

Doi et al.

Patent Number: 6,045,605
Date of Patent: Apr. 4, 2000

[54] ABRASIVE MATERIAL FOR POLISHING A SEMICONDUCTOR WAFER, AND METHODS FOR MANUFACTURING AND USING THE ABRASIVE MATERIAL

[75] Inventors: Kenji Doi, Kawasaki; Naoto Miyashita; Masahiro Abe, both of Yokohama; Hiroyuki Kohno, Tokuyama; Hiroshi Kato, Tokuyama; Kazuhiko Hayashi, Tokuyama, all of Japan

[73] Assignees: Kabushiki Kaisha Toshiba, Kawasaki; Tokuyama Corporation, Tokuyama, both of Japan

[21] Appl. No.: 09/078,668

[22] Filed: May 14, 1998

[30] Foreign Application Priority Data

May 15, 1997 [JP] Japan ................................. 9-139157

[51] Int. Cl.[7] ................................. B24B 1/00; C09G 1/02
[52] U.S. Cl. .............................. 106/3; 252/77.1; 51/307; 216/89; 438/693
[58] Field of Search ............................... 106/3; 257/79.1; 51/307; 216/89; 438/692, 693

[56] References Cited

U.S. PATENT DOCUMENTS 5,733,819  3/1998  Kodama et al. ............................. 106/3
5,876,490  3/1999  Ronay ........................................ 106/3

FOREIGN PATENT DOCUMENTS 8-110575  10/1994  Japan.

*Primary Examiner*—C. Melissa Koslow
*Attorney, Agent, or Firm*—Finnegan, Henderson, Farabow, Garrett & Dunner, L.L.P.

[57] ABSTRACT

An abrasive material is prepared by dispersing silicon nitride particles acting as abrasive particles in a solvent such as a pure water or an ultra pure water, followed by adding an adsorptive stickable to the abrasive particles to the dispersion. The resultant abrasive material permits diminishing the polishing rate of a silicon nitride film used as a stopper film, with the result that a CVD $SiO_2$ film to be polished is selectively polished relative to the $Si_3N_4$ film used as the stopper film. This makes it possible to make the stopper film as thin as possible and permits the CVD $SiO_2$ film to be flattened efficiently without bringing about a dishing problem.

17 Claims, 5 Drawing Sheets

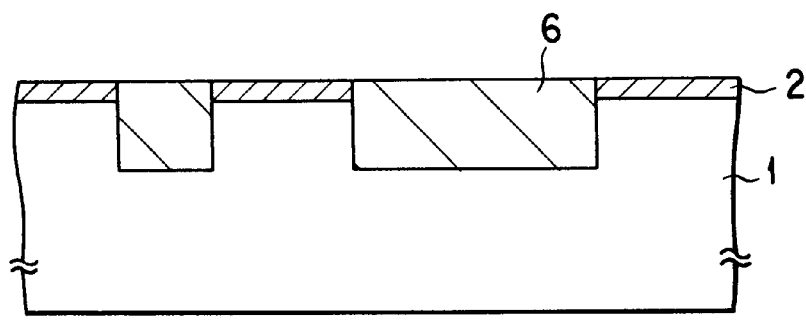
F I G. 11
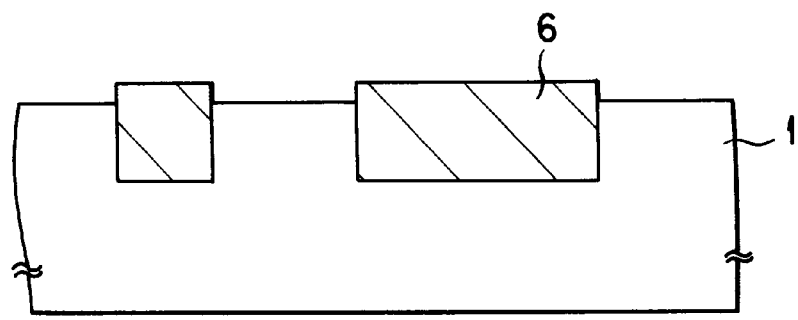
F I G. 12
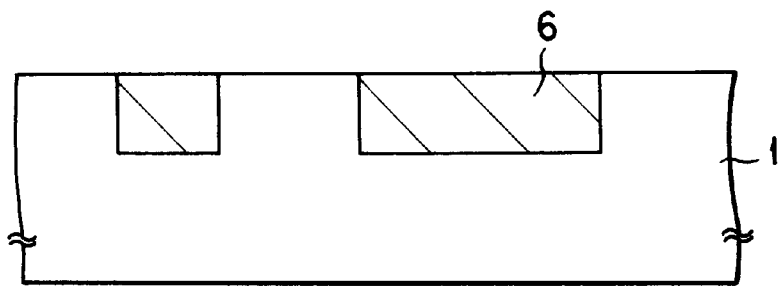
F I G. 13

ABRASIVE MATERIAL FOR POLISHING A SEMICONDUCTOR WAFER, AND METHODS FOR MANUFACTURING AND USING THE ABRASIVE MATERIAL

BACKGROUND OF THE INVENTION

The present invention relates to a CMP (Chemical Mechanical Polishing) method, particularly, to an abrasive composition used in the CMP method, a method of manufacturing said abrasive composition, and a method of polishing a semiconductor wafer using the abrasive composition.

A polishing apparatus comprises a polishing plate having a surface covered with a polishing pad and rotated by, for example, a motor and a suction plate for supporting the rotating polishing plate. In a general method of polishing a substrate using the polishing apparatus, a surface to be polished of the substrate, which is rotated, is pressed against the rotating polishing plate while supplying an abrasive material in the form of a slurry to the polishing point. The polishing technology utilizing the polishing apparatus is employed in the manufacture of, for example, a semiconductor device.

The manufacturing method a semiconductor apparatus such as an IC or an LSI comprises a design step for designing an integrated circuit which is to be formed on a semiconductor substrate, a mask preparation step for depicting electron beams used for forming the integrated circuit, a wafer manufacturing step for forming a wafer having a predetermined thickness from a single crystal ingot, a wafer processing step for forming a semiconductor device such as an integrated circuit on the wafer, an assembling step for separating the wafer into individual semiconductor devices and for packaging the separated semiconductor device to obtain a semiconductor apparatus, and inspecting the resultant semiconductor apparatus. It is necessary to use a special manufacturing apparatus in each of these process steps.

An etch back RIE (Reactive Ion Etching) is known as a typical method employed in the wafer processing step for burying an optional material such as a metal, polycrystalline silicon (polysilicon), or a silicon oxide film ($SiO_2$) in a concavity such as a trench or a contact hole, followed by flattening the surface thereof.

However, the etch back RIE method leaves much room for further improvement. For example, the etch back RIE method requires many process steps including the step of coating an etch back resist. Also, the wafer surface tends to receive a RIE damage, making it difficult to flatten the wafer surface sufficiently. Further, since a vacuum-based apparatus is used, the apparatus used is rendered complex in construction. Still further, a dangerous etching gas is used in the etch back RIE method.

Under the circumstances, the CMP method referred to previously attracts attentions recently in place of the etch back RIE method.

Where a polishing apparatus is used for flattening a silicon oxide (CVD $SiO_2$) film buried in a concavity of a semiconductor substrate by a chemical vapor deposition or a silicon oxide (CVD $SiO_2$) film formed by a chemical vapor deposition for use as an interlayer insulating film in a multi-layer wiring, an over-polishing brings about a dishing problem, i.e., the phenomenon that the over-polished region is recessed in the shape of a dish. In order to prevent the dishing problem and to stop the polishing at a desired film thickness, a stopper film is generally used in the polishing apparatus.

Where, for example, an oxide film is polished, used is a slurry-like abrasive material prepared by dispersing cerium oxide particles or silica particles as abrasive particles. The abrasive material having silica particles dispersed therein exhibits a low polishing rate. On the other hand, the abrasive material having cerium oxide particles dispersed therein exhibits a high polishing rate.

However, where an abrasive slurry having cerium oxide particles dispersed therein is used as an abrasive material and a silicon nitride film is used as a stopper film, a ratio of the silicon oxide film polishing rate to the silicon nitride film polishing rate, i.e., a silicon oxide film/silicon nitride film selectivity ratio, is about 2. On the other hand, where a polysilicon film is used as a stopper film, the silicon oxide film/polysilicon film selectivity ratio is as low as about 1 to 2. It follows that an over-polishing is brought about so as to remove partly even the stopper film.

Also, where an abrasive slurry having silica particles dispersed therein is used as an abrasive material and a silicon nitride film is used as a stopper film, the silicon oxide film/silicon nitride film selectivity ratio is 2. Even in the case of using a polysilicon film as a stopper film, the silicon oxide film/polysilicon film selectivity ratio is as low as 1. It follows that an over-polishing is brought about to remove partly the stopper film even in the case of using silica particles as abrasive particles.

As described above, an abrasive material exhibiting a sufficiently high polishing rate was not used in the conventional CMP method. Even if the abrasive material exhibits a relatively high polishing rate, the oxide film/stopper film selectivity ratio was low, making it difficult to prevent completely the dishing problem. In addition, a process margin was small.

It was customary in the past to use a thick stopper film in order to prevent the dishing problem caused by the low selectivity ratio, i.e., a ratio in polishing rate of the film to be polished to the stopper film. However, it is necessary to make the stopper film as thin as possible in view of the miniaturization of the apparatus, the polishing efficiency, etc.

Under the circumstances, an improved abrasive slurry is proposed in, for example, Japanese Patent Application No. 8-110575. It is proposed that an abrasive slurry prepared by dispersing abrasive particles consisting essentially of silicon nitride ($Si_3N_4$) in a pure water or an ultra pure water be used in the CMP method. Where a silicon nitride film is used as a stopper film, the abrasive slurry disclosed in JP '575 noted above exhibits a silicon oxide film/silicon nitride film selectivity ratio of 10 to 20. Therefore, compared with the abrasive slurry containing cerium oxide particles or silica particles as the abrasive particles, the abrasive slurry containing silicon nitride particles as the abrasive particles is effective when used in the process employing a silicon nitride film as a stopper film. Further, the abrasive slurry containing silicon nitride particles as the abrasive particles provides a large margin relative to the over-polishing so as to diminish the dishing problem.

Even under the above-noted selectivity ratio, however, it is impossible to prevent completely the dishing problem, making it important to develop an abrasive material exhibiting a higher selectivity ratio. It should also be noted that silicon nitride particles tend to be precipitated and agglomerated, with the result that, where the abrasive slurry is stored over a long period of time, the silicon nitride particles are solidified at the bottom of the slurry container. In this case, it is difficult to disperse again the solidified silicon nitride particles.

Under the circumstances, it is difficult to employ the conventional CMP method in the mass production process of semiconductor devices.

BRIEF SUMMARY OF THE INVENTION

An object of the present invention is to provide an abrasive material for polishing a semiconductor wafer, the abrasive material containing silicon nitride particles as abrasive particles, permitting an object film, i.e., a film to be polished, to be flattened efficiently, and making it possible to use a very thin stopper film, which is formed below the object film.

Another object is to provide a method of manufacturing an abrasive material for polishing a semiconductor wafer, the abrasive material containing as abrasive particles silicon nitride particles which can be kept dispersed satisfactorily during storage of the abrasive material over a long period of time, permitting an object film, i.e., a film to be polished, to be flattened efficiently, and making it possible to use a very thin stopper film, which is formed below the object film.

Further, still another object of the present invention is to provide a method of polishing a semiconductor wafer, which uses as abrasive particles silicon nitride particles which can be kept dispersed satisfactorily in a solvent, which permits an object film, i.e., a film to be polished, to be flattened efficiently, and which makes it possible to use a very thin stopper film, which is formed below the object film.

According to a first aspect of the present invention, there is provided an abrasive material for polishing a semiconductor wafer, comprising silicon nitride particles, a solvent and an absorptive stuck to the silicon nitride particles.

According to a second aspect of the present invention, there is provided a method of manufacturing an abrasive material for polishing a semiconductor wafer, comprising the steps of:

dispersing silicon nitride particles in a solvent to prepare a dispersion;

preparing an acidic dispersion by controlling the pH value of the dispersion in an acidic region; and adding an adsorptive to the acidic dispersion.

Further, according to a third aspect of the present invention, there is provided a method of polishing a semiconductor wafer, comprising the steps of:

dispersing silicon nitride particles in a solvent to prepare a dispersion;

preparing an acidic dispersion by controlling the pH value of the dispersion in an acidic region;

adding an adsorptive to the acidic dispersion to obtain an abrasive material; and polishing a semiconductor wafer with the abrasive material.

In the present invention, an abrasive material comprising abrasive particles consisting essentially of silicon nitride particles, a solvent, and an adsorptive stickable to the abrasive particles is used for polishing a semiconductor wafer. The particular abrasive material of the present invention permits diminishing the polishing rate of the silicon nitride film used as a stopper film, with the result that a CVD $SiO_2$ film formed by chemical vapor deposition is selectively polished. It follows that an object film, i.e., a film to be polished, can be flattened efficiently. In addition, use of the particular abrasive material permits forming a stopper film as thin as possible.

The present invention also provides a method of manufacturing an abrasive material, which permits easily manufacturing the abrasive material referred to above. It should be noted that, in the manufacturing method of the present invention, the pH value of a dispersion containing abrasive particles is controlled in an acidic region, followed by adding an adsorptive to the dispersion. As a result, the abrasive particles are kept dispersed sufficiently in the dispersion during storage of the dispersion over a long period of time.

Further, the present invention provides a polishing method, which permits selectively polishing a CVD $SiO_2$ film used as an object film. It follows that the object film can be flatted highly efficiently, making it possible to flatten sufficiently a semiconductor wafer which does not include a stopper film. Of course, the abrasive particles contained in the abrasive material can be kept dispersed sufficiently during storage of the abrasive material over a long period of time.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5 to 13 are cross sectional views collectively showing process steps of a semiconductor wafer.

DETAILED DESCRIPTION OF THE INVENTION

Figure 1:
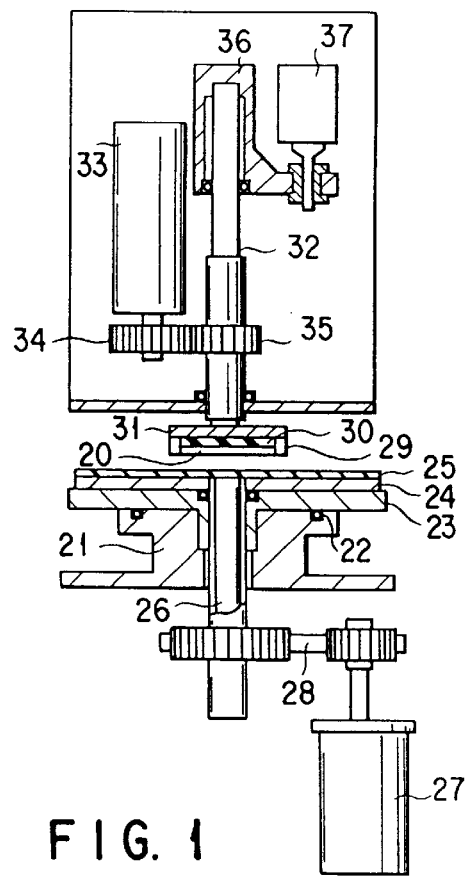
FIG. 1 schematically shows the construction of a polishing apparatus used in the present invention.

The abrasive material of the present invention, which can be effectively used for polishing a semiconductor wafer by means of a CMP method, comprises abrasive particles consisting essentially of silicon nitride ($Si_3N_4$) particles, a solvent and an adsorptive stickable to the abrasive particles.

If the abrasive material of the present invention is used for polishing a semiconductor wafer, it is considered that the adsorptive contained in the abrasive material may be adsorbed on the silicon nitride particles and on the silicon nitride film used as a stopper film. As a result, it is considered that a repulsive force is generated between the silicon nitride particles and the silicon nitride film so as to diminish the polishing rate of the silicon nitride film. It follows that the object film of a CVD $SiO_2$ film is selectively polished, leading to a high CVD $SiO_2/Si_3N_4$ film selectivity ratio. Naturally, the abrasive material of the present invention makes it possible to flatten the object film efficiently. It should also be noted that, since the CVD SiO$_2$ film can be polished selectively, the stopper film formed below the object film can be made sufficiently thin.

The method of the present invention for manufacturing an abrasive material, which is used for polishing a semiconductor wafer, provides a preferred example of a method of manufacturing the abrasive material of the present invention described above, and comprises the step of dispersing silicon nitride particles in a solvent to prepare a dispersion, the step of preparing an acidic dispersion by controlling the pH value of said dispersion in an acidic region, and the step of adding an adsorptive to said acidic dispersion.

The manufacturing method of the present invention makes it possible to obtain easily an abrasive material which permits diminishing the polishing rate of a Si$_3$N$_4$ film used as a stopper film and also permits a high CVD SiO$_2$/Si$_3$N$_4$ film selectivity ratio. It should also be noted that, in the method of manufacturing an abrasive agent of the present invention, an adsorptive is added to an acidic dispersion prepared by controlling the pH value of the dispersion of silicon nitride particles, with the result that agglomeration and precipitation of the silicon nitride particles can be markedly suppressed. It follows that the silicon nitride particles can be kept dispersed sufficiently in the abrasive material during storage of the abrasive material over a long period of time.

Further, the present invention provides a method of polishing a semiconductor wafer, in which the abrasive material prepared by the method of the present invention is used for polishing a semiconductor wafer. The polishing method of the present invention comprises the step of dispersing silicon nitride particles in a solvent to prepare a dispersion, the step of preparing an acidic dispersion by controlling the pH value of said dispersion in an acidic region, the step of adding an adsorptive to said acidic dispersion to obtain an abrasive material, and the step of polishing a semiconductor wafer with said abrasive material.

Used in the polishing method of the semiconductor wafer is an abrasive material which permits diminishing the polishing rate of a Si$_3$N$_4$ film used as a stopper film and also permits a high CVD SiO$_2$/Si$_3$N$_4$ film selectivity ratio. It should also be noted that, in the manufacture of the abrasive agent used in the wafer polishing method of the present invention, an adsorptive is added to an acidic dispersion prepared by controlling the pH value of the dispersion of silicon nitride particles, with the result that agglomeration and precipitation of the silicon nitride particles can be markedly suppressed. It follows that the object film can be flattened efficiently without giving rise to the dishing problem. It is also possible to make the stopper film used in the polishing process as thin as possible.

The adsorptive used in the present invention includes, for example, an organic compound having an anionic group, for example, a carboxyl group, a sulfonic group, or a phosphoric group. Preferably, it is desirable to use an organic compound having a carboxyl group. It is also possible to use as the adsorptive an organic compound having an acid anhydride group. The organic compounds having a carboxyl group include, for example, aliphatic carboxylic acids such as maleic acid (HOOCCH=CHCOOH), formic acid (HCOOH), acetic acid, adipic acid, succinic acid, and malonic acid, and aromatic carboxylic acids such as benzoic acid, phthalic acid, trimellitic acid, and pyromellitic acid. The organic compounds having an acid anhydride group include an organic compound having a polyoxyalkylene group and an acid anhydride group. A preferred acid anhydride group is, for example, maleic anhydride group.

It is more desirable to use as the adsorptive a high molecular compound represented by chemical formula (1) given below:

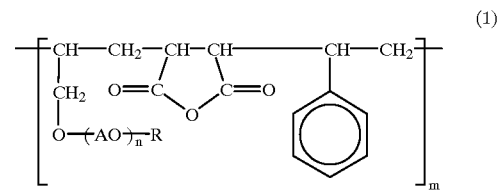

where A denotes an ethylene group or a propylene group, m is an integer of 1 to 50, and n is an integer of 1 to 10.

It is desirable for the adsorptive to be contained in the abrasive material in an amount of 1,000 to 20,000 ppm relative to the entire weight of the abrasive material.

The concentration of the silicon nitride particles should be 1 to 15% by weight, preferably 5 to 10% by weight, based on the total amount of the abrasive material. The value given above denotes the concentration of the silicon nitride particles at the time when the abrasive material is used for polishing a semiconductor wafer. It is possible to handle the abrasive material with the silicon nitride particle concentration set to fall within a range of between 1% by weight and 50% by weight, as required.

In the pH control step, the pH value of the silicon nitride particle dispersion can be controlled at 3 to 5.

Let us describe the present invention more in detail with reference to the accompanying drawings. Specifically, FIG. 1 is a cross sectional view schematically showing the construction of a polishing apparatus for CMP using an abrasive material of the present invention. As shown in the apparatus, the polishing apparatus comprises a rotatable polishing plate 24 for polishing a semiconductor wafer 20 and a rotatable suction plate 31 for supporting the semiconductor wafer 20, said suction plate 31 being positioned to face the polishing plate 24.

The polishing plate 24 is mounted on a polishing plate receptacle 23. On the other hand, the polishing plate receptacle 23 is arranged on a stage 21 with a bearing 22 interposed therebetween. Further, a polishing pad 25 for polishing the semiconductor wafer 20 is mounted on the polishing plate 24. A driving shaft 26 for rotating the polishing plate receptacle 23 and the polishing plate 24 extend through the central portions of these receptacle 23 and polishing plate 24. The driving shaft 26 is rotated by a motor 27 via an endless belt 28 stretched therebetween.

On the other hand, the semiconductor wafer 20 is positioned to face the polishing pad 25 and held stationary by a cloth 30 mounted to the suction plate 31 by vacuum suction or water wetting and by a template 29. The suction plate 31 is connected to a driving shaft 32, which is rotated by a motor 33 via gears 34 and 35. The driving shaft 32 is fixed to a driving pedestal 36 which is mounted to a cylinder 37. The driving shaft 36 is moved up and down in accordance with movement of the cylinder 37 in a vertical direction. An abrasive material is supplied between the semiconductor wafer 20 fixed to the suction plate 31 and the polishing pad 25 so as to polish the semiconductor wafer 20.

Figure 2:
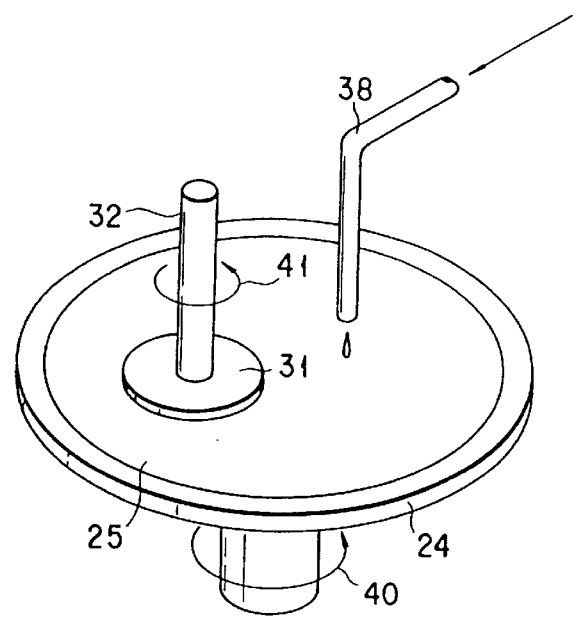
FIG. 2 shows how the polishing apparatus shown in FIG. 1 is used.

FIG. 2 is an oblique view showing how the polishing apparatus described above is operated for polishing the semiconductor wafer. As shown in the drawing, the semiconductor wafer held stationary by the suction plate 31 is pushed against the polishing pad 25 covering the polishing plate 24 which is rotated at, for example, about 30 rpm in a direction denoted by an arrow 40. The suction plate 31 is fixed to the driving shaft 32 which is rotated at, for example, about 30 rpm in a direction denoted by an arrow 41. Under this condition, an abrasive material supplied through a supply pipe 38 leading from an abrasive material tank (not shown) is dripped onto the polishing region so as to polish the semiconductor wafer 20.

The abrasive material used in this polishing apparatus is prepared by dispersing 1 to 15% by weight, preferably 5 to 10% by weight, of abrasive particles consisting of silicon nitride ($Si_3N_4$) in a pure water or an ultra pure water, followed by adding a suitable amount of, for example, $HNO_3$ and $NH_3$ to the dispersion so as to control the pH value of the dispersion at 3 to 5 and subsequently adding an adsorptive consisting of an organic compound represented by chemical formula (1) given previously to the pH controlled dispersion. The adsorptive should be added in an amount of, for example, 1,000 to 20,000 ppm, preferably 2,000 to 5,000 ppm, based on the total amount of the abrasive material.

It is possible to dilute the abrasive material of the present invention with a pure water or an ultra pure water in polishing the semiconductor wafer. In the case of using a diluted abrasive material, the stepped region of the semiconductor wafer is shaped sharp and clear, making it possible to polish the wafer without using a stopper film. Particularly, the diluted abrasive material is suitable for polishing a relatively thick object film.

The abrasive material used in the present invention should have a viscosity of about 1 to 10 cP, and the polishing temperature should be about 20 to 70° C.

The silicon nitride particles used as the abrasive particles should desirably have a primary particle diameter of 50 to 1,000 nm and a secondary particle diameter of 100 to 2,000 nm.

It is considered that the adsorptive added to the abrasive material is adsorbed on the silicon nitride particles and on a silicon nitride film used as a stopper film. It follows that a repulsive force is generated between the silicon nitride particles and the silicon nitride film so as to permit an object film of CVD $SiO_2$ film to be selectively polished.

Figure 3:
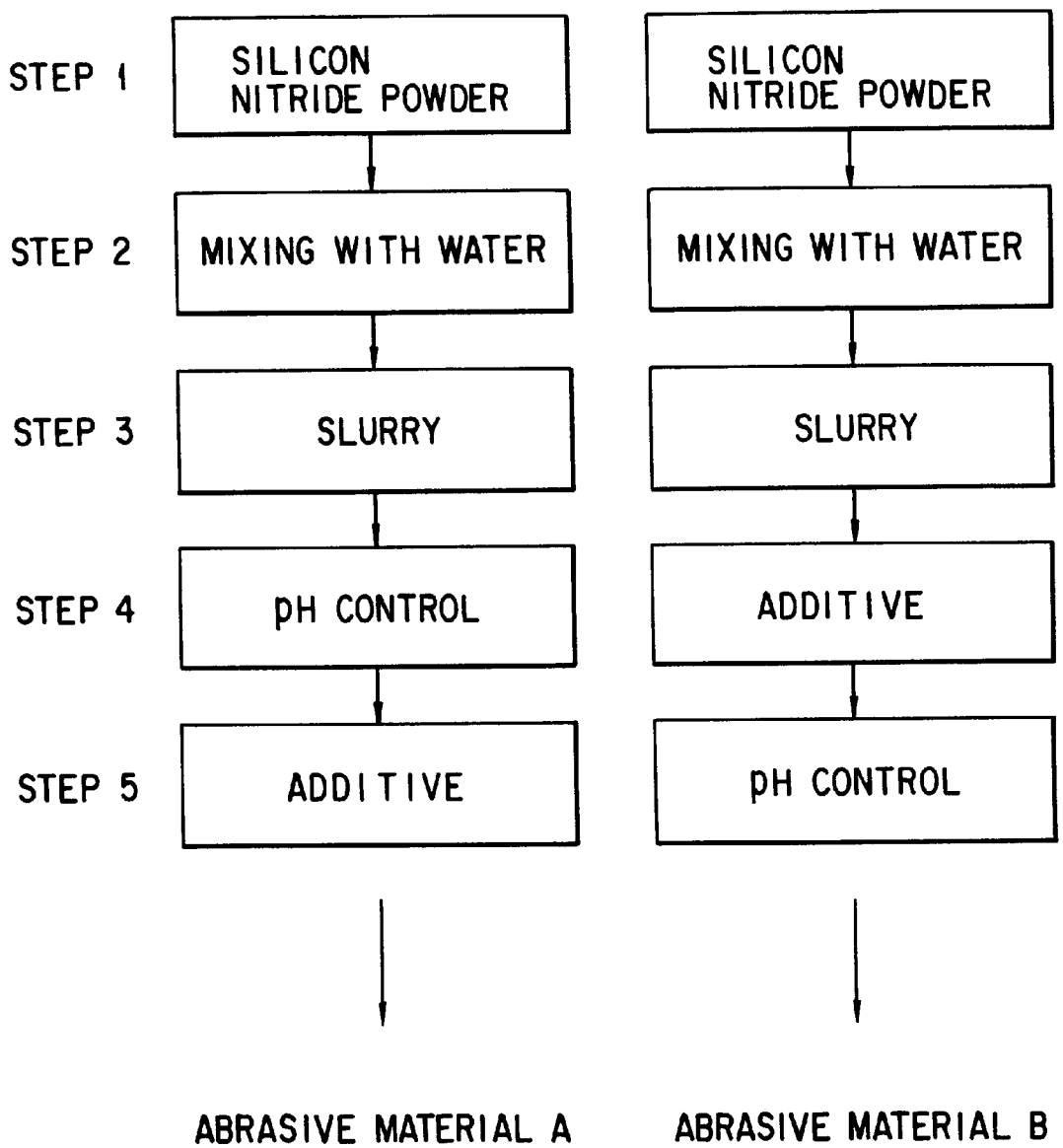
FIG. 3 is a flow chart exemplifying a manufacturing process of the abrasive material of the present invention.
Figure 4:
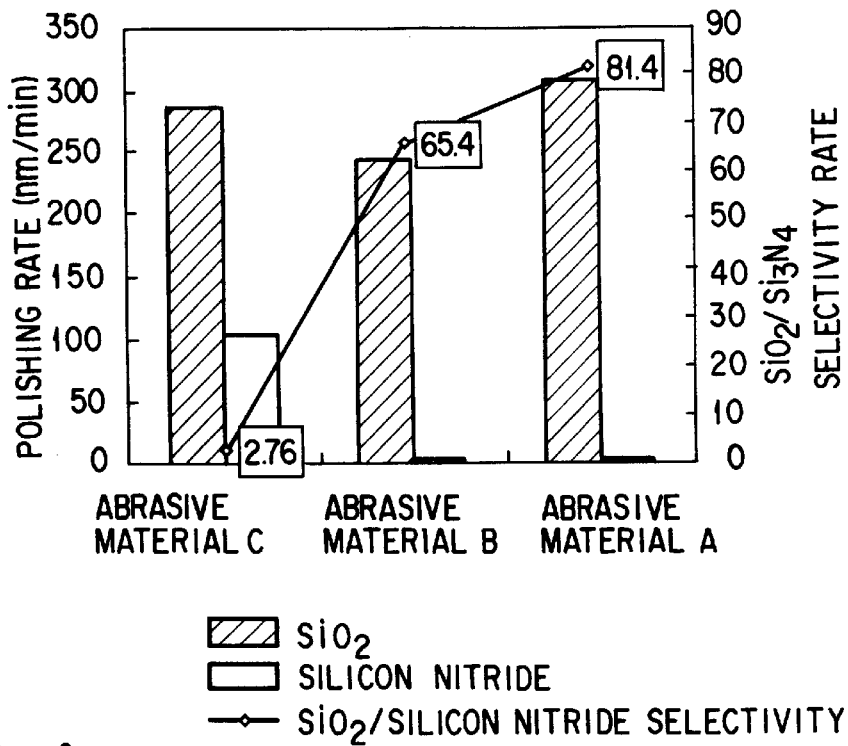
FIG. 4 is a graph showing the polishing rate and $SiO_2$ film/$Si_3N_4$ film selectivity ratio in respect of abrasive materials A and B of the present invention and a conventional abrasive material C.

Let us describe more in detail the abrasive material of the present invention with reference to FIGS. 3 and 4. Specifically, FIG. 3 is a flow chart exemplifying a manufacturing process of an abrasive material of the present invention. On the other hand, FIG. 4 is a graph showing the polishing rate and the $SiO_2$ film/$Si_3N_4$ film selectivity ratio covering the cases of using the abrasive materials A and B of the present invention and the conventional abrasive material C containing silicon nitride particles. In the graph of FIG. 4, the polishing rate is plotted on the ordinate on the left side. Also, the $SiO_2$ film/$Si_3N_4$ film selectivity ratio is plotted on the ordinate on the right side.

The abrasive material A of the present invention was prepared by steps 1 to 5 shown in FIG. 3. Specifically, the silicon nitride particles prepared in step 1 was dispersed in step 2 in a solvent consisting of a pure water or an ultra pure water so as to prepare a dispersion in the form of a slurry in step 3. Then, the pH value of the dispersion was controlled in step 4 in an acidic region, followed by adding in step 5 a high molecular weight compound represented by formula (1) given previously to the pH controlled dispersion so as to obtain the abrasive material A of the present invention.

The abrasive material B of the present invention was equal in composition to the abrasive material A, and was prepared by the process substantially equal to that for preparing the abrasive material A, except that the high molecular weight compound represented by chemical formula (1) was added in step 4 to the slurry prepared in step 3, followed by controlling the pH value of the resultant dispersion in step 5 in an acidic region.

On the other hand, the conventional abrasive material C was prepared by dispersing silicon nitride particles used as abrasive particles in a solvent consisting of a pure water or an ultra pure water, followed by sufficiently mixing the resultant dispersion to convert the dispersion into a slurry. In general, the pH value of the slurry thus prepared is controlled in an acidic region and is used a predetermined time later for polishing a semiconductor wafer.

In polishing a semiconductor wafer, it is necessary to supply a slurry (abrasive material) having a predetermined pH value onto the polishing plate. It should be noted in this connection that the pH value of silicon nitride particles is changed when simply mixed with a pure water, which has a pH value of 7, making it necessary to control the pH value of the slurry. In general, the pH value of a water dispersion of silicon nitride particles, even if controlled in advance in an acidic region, tends to increase with time so as to become alkaline. To overcome the difficulty, an adsorptive is added in the present invention to the slurry whose pH value is controlled in advance in an acidic region like the abrasive material A of the present invention. As a result, it is possible to obtain a stable slurry, in which the silicon nitride particles, even if precipitated, are not solidified, and can be dispersed again. The mechanism of the particular phenomenon has not yet been clarified sufficiently. However, it is considered reasonable to understand that, since the potential of the silicon nitride particles is changed depending on the pH value of the slurry, a slurry which is not solidified can be obtained by adding an adsorptive to the slurry under the condition that the silicon nitride particles are positively charged in advance. On the other hand, the silicon nitride particles were found to have been solidified in the abrasive material B.

FIG. 4 clearly shows that the abrasive materials A and B of the present invention are markedly superior to the conventional abrasive material C in the $SiO_2$ film/$Si_3N_4$ film selectivity ratio. To be more specific, the abrasive material A permits more than 300 nm/min of the polishing rate of the $SiO_2$ film. The conventional abrasive material C also permits a high polishing rate, i.e., 285 nm/min. Further, the polishing rate achieved by the abrasive material B of the present invention was only about 245 nm/min.

On the other hand, the polishing rate of a $Si_3N_4$ film used as a stopper film was only about 30 to 40 nm/min in the case of the abrasive materials A and B of the present invention. In the case of the conventional abrasive material C, however, the polishing rate of the $Si_3N_4$ film was as high as about 100 nm/min.

It follows that the $SiO_2$ film/$Si_3N_4$ film selectivity ratio for the conventional abrasive material C was only about 2.76. On the other hand, the $SiO_2$ film/$Si_3N_4$ film selectivity ratio was as high as 65.4 for the abrasive material B and as high as 81.4 for the abrasive material A prepared by adding an adsorptive to the slurry after the pH control step.

Incidentally, solidified silicon nitride particles are left in some cases at the bottom of the abrasive material tank when it comes to the abrasive material B of the present invention and the conventional abrasive material C.

As described above, each of the abrasive materials A and B of the present invention exhibits a low polishing rate of a $Si_3N_4$ film, leading to a very high $SiO_2$ film/$Si_3N_4$ film selectivity ratio, compared with the conventional abrasive material C. It follows that a satisfactory polishing of an object film can be performed without giving rise to the dishing problem in the case of using the abrasive materials A and B of the present invention. It should also be noted that the abrasive material A of the present invention, which was prepared by adding an adsorptive after the pH control step as specified in the method of the present invention, was found to be superior to the abrasive material B in the $SiO_2$ film/$Si_3N_4$ film selectivity ratio, supporting that the abrasive material A of the present invention makes it possible to polish a semiconductor wafer more satisfactorily.

A semiconductor wafer was actually polished by using the abrasive material A of the present invention as shown in FIGS. 5 to 13. Specifically, FIGS. 5 to 13 are cross sectional views collectively showing the steps of processing a semiconductor wafer in an element isolation method, in which a groove is formed in a silicon semiconductor substrate, followed by burying the groove with a CVD oxide film and subsequently polishing the buried oxide film to flatten the oxide film.

Figure 5:
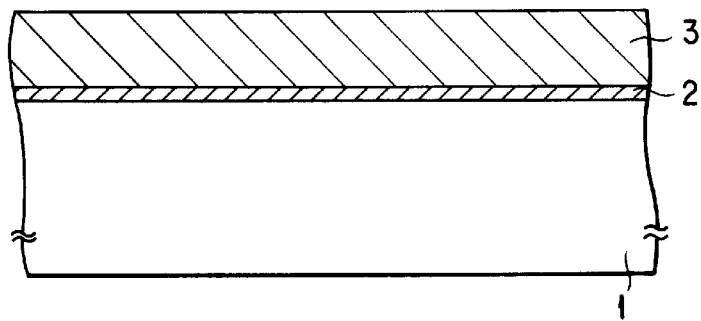

In the first step, a silicon nitride film 2 acting as a stopper film in the polishing step of an oxide film was deposited on a silicon semiconductor substrate 1 in a thickness of about 70 nm, as shown in FIG. 5. Then, a CVD $SiO_2$ film 3 acting as a mask in the step of forming a groove was deposited on the silicon nitride film 2.

Figure 6:
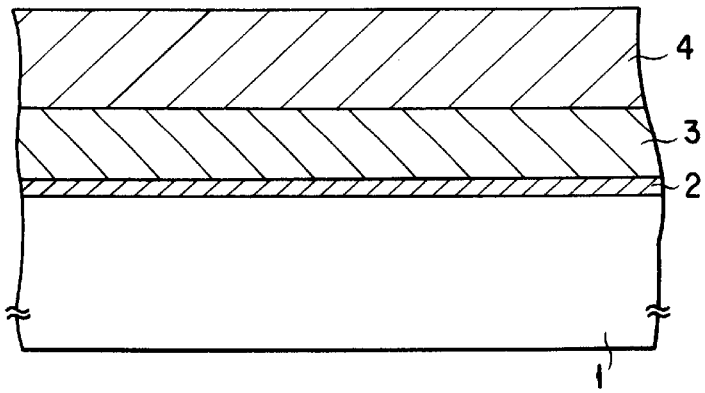
Figure 7:
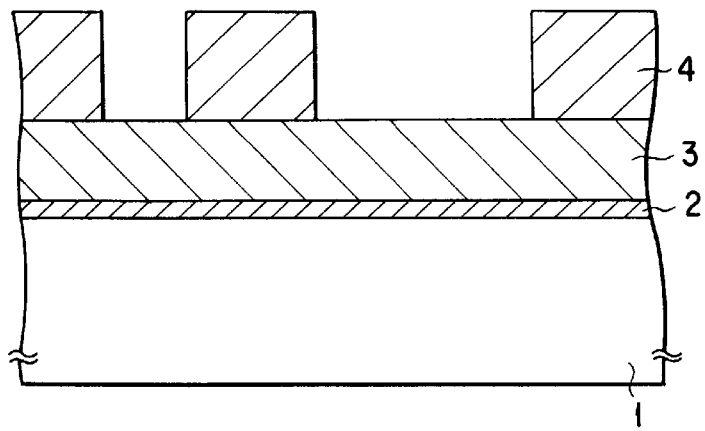
Figure 8:
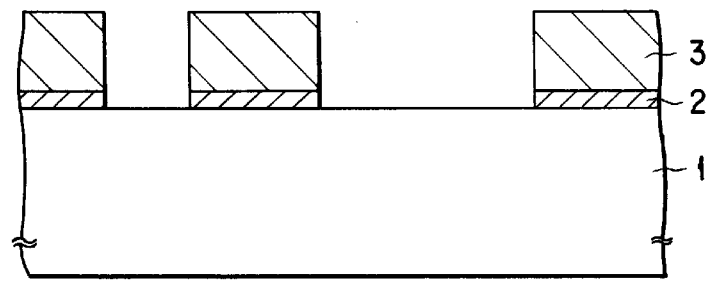

In the next step, the entire surface of the CVD $SiO_2$ film 3 was coated with a photoresist layer 4, as shown in FIG. 6, followed by patterning the photoresist layer 4 to conform with the pattern of the mask for forming a groove and the stopper film, as shown in FIG. 7. Then, the laminate structure consisting of the silicon nitride film 2 and the CVD $SiO_2$ film 3 was selectively removed by, for example, RIE using the patterned photoresist layer 4 as a mask, followed by removing the mask, as shown in FIG. 8.

Figure 9:
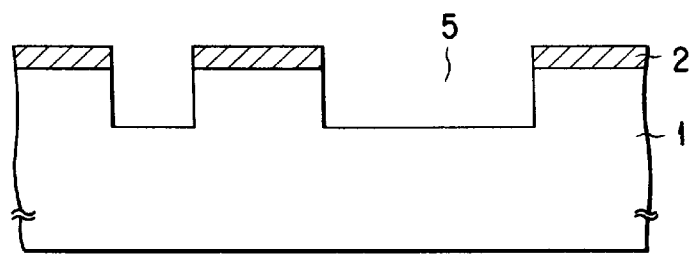
Figure 10:
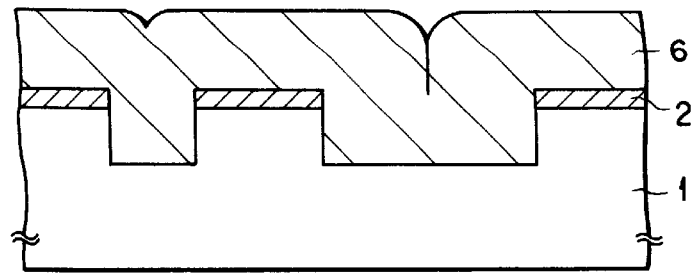

Further, the residual CVD $SiO_2$ film 3 was removed, followed by forming a groove 5 by RIE, as shown in FIG. 9. After formation of the groove 5, the reaction product formed in the RIE processing step and the damaged layer were removed by a wet treatment. Then, a CVD $SiO_2$ layer 6 or a BPSG film was formed to cover the silicon nitride film 2 and fill the groove 5, as shown in FIG. 10.

The CVD $SiO_2$ 6 thus formed was polished by the polishing apparatus shown in FIG. 1. The abrasive material used for operating the polishing apparatus was prepared by dispersing silicon nitride particles as abrasive particles in a solvent, i.e., a pure water or an ultra pure water. The adsorptive described previously was also added to the abrasive material. Further, the abrasive material used was found to exhibit a viscosity of about 2 cP. FIG. 11 shows that the CVD $SiO_2$ film 6 was flattened by the polishing treatment.

After the polishing treatment, the silicon nitride film 2 used as a stopper film was removed by etching, as shown in FIG. 12. Further, a finish polishing was applied to the CVD $SiO_2$ film 6 to make the upper surface of the CVD $SiO_2$ film 6 flush with the surface of the semiconductor wafer, as shown in FIG. 13. As apparent from the drawing, dishing was not formed at all in any of the silicon semiconductor substrate 1 and the CVD $SiO_2$ 6 buried in the substrate 1.

In the embodiment described above, silicon nitride particles were used as abrasive particles. Also, a silicon nitride film was used as the stopper film. Since the abrasive particles and the stopper film were formed of the same material, it was possible to achieve a high object film/stopper film selectivity ratio.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. An abrasive material for polishing a semiconductor wafer, comprising silicon nitride particles, a solvent and an adsorptive stuck to said silicon nitride particles, wherein said adsorptive is an organic compound having an acid anhydride group.

2. The abrasive material according to claim 1, wherein said adsorptive is an organic compound having a polyoxyalkylene group and an acid anhydride group.

3. The abrasive material according to claim 2, wherein said adsorptive is an organic compound represented by chemical formula (1) given below:

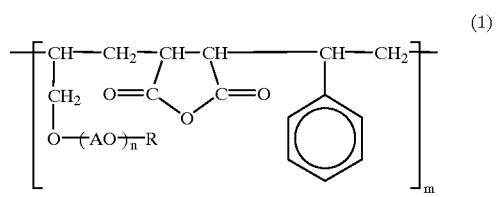

where A denotes an ethylene group or a propylene group, m is an integer of 1 to 50, and n is an integer of 1 to 10.

4. The abrasive material according to claim 1, wherein said adsorptive is contained in an amount of 1,000 to 20,000 ppm based on the total amount of said abrasive material.

5. The abrasive material according to claim 1, wherein said silicon nitride particles are contained in an amount of 1 to 15% by weight based on the total amount of the abrasive material.

6. A method of manufacturing an abrasive material for polishing a semiconductor wafer, comprising the steps of:
   dispersing silicon nitride particles in a solvent to prepare a dispersion;
   preparing an acidic dispersion by controlling the pH value of said dispersion in an acidic region; and
   adding an adsorptive to said acidic dispersion;
   wherein said adsorptive consists of an organic compound having an acid anhydride group.

7. The method according to claim 6, wherein said adsorptive consists of an organic compound having a polyoxyalkylene group and an acid anhydride group.

8. The method according to claim 7, wherein said adsorptive consists of an organic compound represented by chemical formula (1) given below:

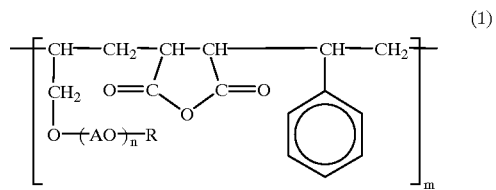

where A denotes an ethylene group or a propylene group, m is an integer of 1 to 50, and n is an integer of 1 to 10.

9. The method to claim 6, wherein said adsorptive is contained in an amount of 1,000 to 20,000 ppm based on the total amount of said abrasive material.

10. The method according to claim 6, wherein said silicon nitride particles are contained in an amount of 1 to 15% by weight based on the total amount of the abrasive material.

11. The method according to claim 6, wherein the pH value of said dispersion is controlled at 3 to 5 in the step of preparing said acidic dispersion.

12. A method of polishing a semiconductor wafer, comprising the steps of:

dispersing silicon nitride particles in a solvent to prepare a dispersion;

preparing an acidic dispersion by controlling the pH value of said dispersion in an acidic region;

adding an adsorptive to said acidic dispersion to obtain an abrasive material; and polishing a semiconductor wafer with said abrasive material;

wherein said adsorptive consists of an organic compound having an acid anhydride group.

13. The method according to claim 12, wherein said adsorptive consists of an organic compound having a polyoxyalkylene group and an acid anhydride group.

14. The method according to claim 13, wherein said adsorptive consists of an organic compound represented by chemical formula (1) given below:

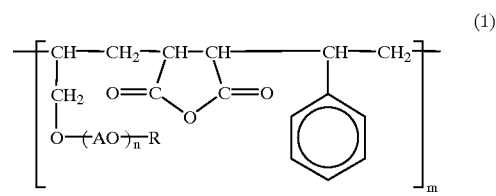

where A denotes an ethylene group or a propylene group, m is an integer of 1 to 50, and n is an integer of 1 to 10.

15. The method to claim 12, wherein said adsorptive is contained in an amount of 1,000 to 20,000 ppm based on the total amount of said abrasive material.

16. The method according to claim 12, wherein said silicon nitride particles are contained in an amount of 1 to 15% by weight based on the total amount of the abrasive material.

17. The method according to claim 12, wherein the pH value of said dispersion is controlled at 3 to 5 in the step of preparing said acidic dispersion.

* * * * *